United States Patent
Katou et al.

(10) Patent No.: US 6,806,436 B2
(45) Date of Patent: Oct. 19, 2004

(54) SERIES SPOT WELDING METHOD, DEVICE FOR CARRYING OUT THE METHOD, AND ELECTRODES EMPLOYED IN THE METHOD OR THE DEVICE

(75) Inventors: Shinya Katou, Kariya (JP); Seiichi Kamiya, Kariya (JP); Kazuhiro Noma, Chiryuu (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 0 days.

(21) Appl. No.: 10/154,830

(22) Filed: May 28, 2002

(65) Prior Publication Data

US 2003/0222054 A1 Dec. 4, 2003

(51) Int. Cl.[7] ............................................... B23K 11/24
(52) U.S. Cl. ....................................... 219/86.9; 219/92
(58) Field of Search ...................... 219/86.9, 87, 91.23, 219/91.2, 92

(56) References Cited

U.S. PATENT DOCUMENTS

| | | | | |
|---|---|---|---|---|
| 1,607,262 A | * | 11/1926 | Ledwinka | 219/91.23 |
| 1,900,161 A | * | 3/1933 | Cohan | 219/91.23 |
| 2,137,909 A | | 11/1938 | Hagedorn | 219/86.9 |
| 4,427,869 A | | 1/1984 | Kimura et al. | 219/93 |
| 5,285,043 A | * | 2/1994 | Smith | 219/87 |
| 5,324,910 A | | 6/1994 | Isawa | |

FOREIGN PATENT DOCUMENTS

| | | |
|---|---|---|
| DE | 23 42 575 | 3/1975 |
| DE | 216 662 A1 | 12/1984 |
| JP | A 10-85947 | 4/1998 |
| JP | A 10-128551 | 5/1998 |
| JP | A 11-333569 | 12/1999 |

* cited by examiner

Primary Examiner—Kiley Stoner
Assistant Examiner—Len Tran
(74) Attorney, Agent, or Firm—Oliff & Berridge, PLC

(57) ABSTRACT

In a series spot welding method, leading edge portions of pressed electrode tips crush bearing surfaces that are one stage higher than a general portion. Thereby, the bearing surfaces are first deformed into a spherical shape. The bearing surfaces thus deformed into the spherical shape are then brought into spot contact with a second steel plate. Thus, the bearing surfaces thus deformed into the spherical shape form a conduction path narrowed down to a spot, between a first steel plate and the second steel plate. Therefore, the density of welding current flowing through the conduction path can be enhanced, and a nugget of sufficient size can be created between the first and second steel plates.

16 Claims, 16 Drawing Sheets

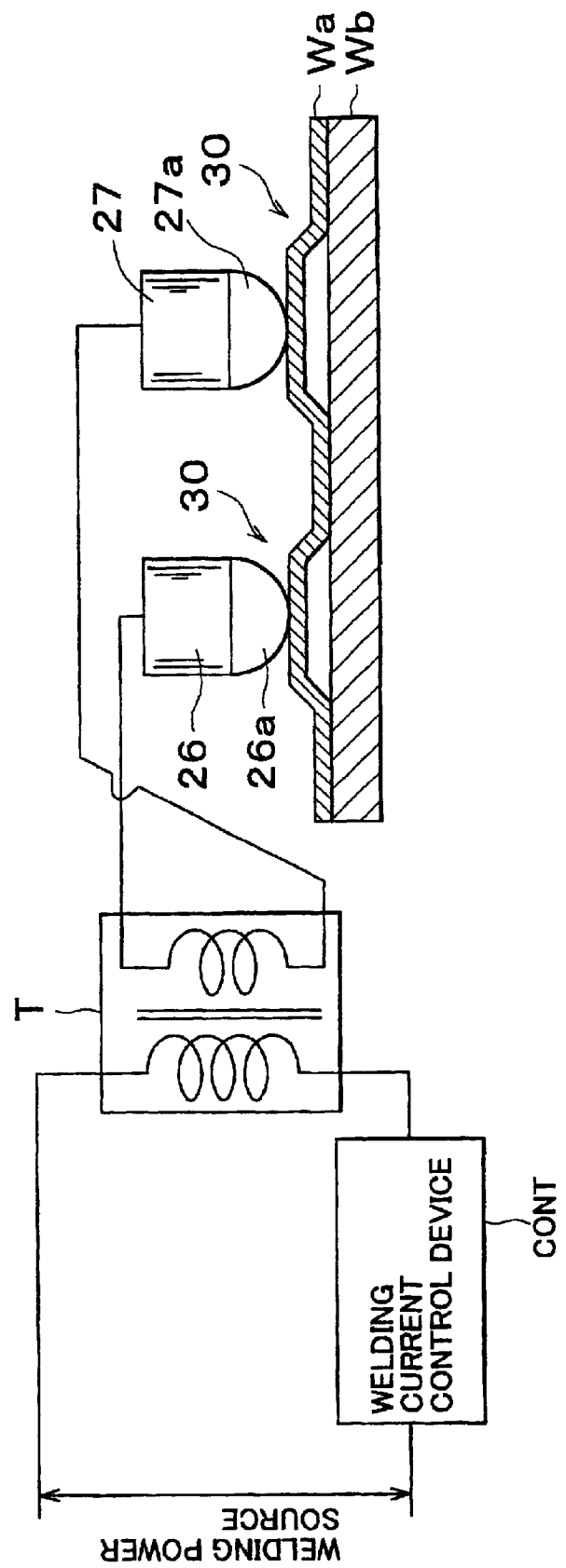

SERIES SPOT WELDING METHOD, DEVICE FOR CARRYING OUT THE METHOD, AND ELECTRODES EMPLOYED IN THE METHOD OR THE DEVICE

The disclosure of Japanese Patent Applications No. 2001-076054 filed on Mar. 16, 2001 and No. 2001-371254 filed on Dec. 6, 2000, each including the specification, drawings and abstract, are incorporated herein by reference in their entireties.

BACKGROUND OF THE INVENTION

1. Field of Invention

The invention relates to a series spot welding method wherein a pair of spaced electrodes is pressed onto a surface of one of two metal plates superimposed on each other and wherein current is caused to flow between the electrodes so as to weld the two metal plates. The invention also relates to a device that performs the series spot welding method. The invention also relates to electrodes employed in the method or the device.

2. Description of Related Art

Direct spot welding has been widely adopted to weld steel plates to each other. In this welding method, two superimposed steel plates are directly pressed while being sandwiched between upper and lower electrode tips, and spot-like welded regions are obtained with the aid of resistance heat generated in the steel plates by causing current to flow therethrough in the direction of thickness. That is, welded regions called welding nuggets (hereinafter simply referred to as "nuggets") are formed in a region of contact between the steel plates when current flows therethrough. These nuggets serve to spot-weld the steel plates to each other.

While such direct spot welding has been performed, there has also been performed another method called series spot welding. According to series spot welding, while two steel plates that are superimposed on each other are pressed by a pair of spaced electrode tips in one direction, current is caused to flow between the electrodes so that spot-like welded regions are obtained.

In general, a back electrode is disposed on the back side of a steel plate located on the other side of a steel plate to be pressed by electrode tips, whereby a current path extending through one of the electrode tips, the superimposed steel plates, the back electrode, the superimposed steel plates, and the other electrode tip is constituted. By causing current to flow through the current path, the superimposed steel plates are welded in a spot manner as in the case of direct spot welding.

However, according to series spot welding employing such a back electrode, if a region processed in a preceding step corresponds to a location where the back electrode is disposed, another component member or the like mounted in the preceding step interferes with the back electrode. Therefore, the back electrode cannot be disposed in this region. Thus, it is inevitable to perform series spot welding with no back electrode disposed. However, if series spot welding is performed with no back electrode disposed, a nugget of sufficient size cannot be formed, and a blow hole is created. As a result, a problem of insufficient welding strength is caused.

SUMMARY OF THE INVENTION

The invention provides a series spot welding method capable of achieving sufficient welding strength even if there is no back electrode, a series spot welding device, and electrodes employed in the method or the device.

A first aspect of the invention relates to a series spot welding method. A first metal plate to be welded by the method of this aspect has two portions described below, namely, a first portion and second portions. The first portion is in contact with the second metal plate when the first and second metal plates are superimposed on each other, and is not welded to the second metal plate. The second portions are away from the second metal plate when the first and second metal plates are superimposed on each other, and are welded to the second metal plate. This method includes the steps of superimposing the first and second metal plates on each other, pressing electrodes having spherical leading edges onto the second portions in a direction toward the second metal plate so as to deform the second portions into a spherical shape, and causing current to flow between the electrodes with the deformed second portions in contact with the second metal plate so as to weld the first and second metal plates to each other.

According to the first aspect of the invention, the second portions are first deformed into a spherical shape by being pressed by the electrodes, and the second portions thus deformed into the spherical shape can then be brought into spot contact with the second metal plate. Thus, a conduction path narrowed down to a spot by the spherically formed second portions is formed between the first and second metal plates. Therefore, the density of current flowing through the conduction path can be enhanced. By causing current to flow through the conduction path, penetration can be caused between the first and second metal plates. That is, a nugget can be formed between the first and second metal plates.

A second aspect of the invention relates to a series spot welding method. A first metal plate to be welded by the method of this aspect has a first portion that is not welded to a second metal plate and a pair of spherical second portions that protrude toward the second metal plate and that are welded to the second metal plate. This method includes the steps of superimposing the first and second metal plates on each other, pressing a pair of electrodes having spherical leading edges onto the second portions respectively, forming the second portions into a spherical shape identical to that of the leading edge of the electrodes and causing current to flow between the electrodes with the second portions formed into the spherical shape in contact with the second metal plate so as to weld the first and second metal plates to each other.

In this method, it is appropriate that the second portions be formed into a spherical shape by being crushed by the electrodes and that the first and second metal plates be then welded to each other. Alternatively, it is also appropriate that the first metal plate formed into the shape of the leading edges of the electrodes (i.e., into the spherical shape) in advance be superimposed on the second metal plate and be welded thereto.

A third aspect of the invention relates to a series spot welding device. This device has a first electrode having a spherical leading edge, a second electrode having a spherical leading edge, a supporting member that supports the first and second electrodes apart from each other by a predetermined distance in the same direction and parallel to each other, a pressing device that presses the first and second electrodes onto superimposed members, and a controller that controls current flowing between the first and second electrodes through the superimposed members, so as to weld the superimposed members each other.

This device makes it possible to carry out the method according to the first or second aspect of the invention.

The electrodes employed in the series spot welding device according to the third aspect of the invention are also included in the scope of the invention.

A structural body welded by the method according to the first or second aspect of the invention is also included in the scope of the invention.

A structural body welded by the device according to the third aspect of the invention is also included in the scope of the invention.

It is also evidently appropriate that a pair of or more second portions be formed in the first metal plate and be welded to the second metal plate at a pair of or more locations by means of the method according to the first or second aspect of the invention or the device according to the third aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 11 is an explanatory view of the configuration of a welding device to which a series spot welding method according to a second embodiment of the invention is applied;

DETAILED DESCRIPTION OF PREFERRED EMBODIMENTS

Figure 6A:
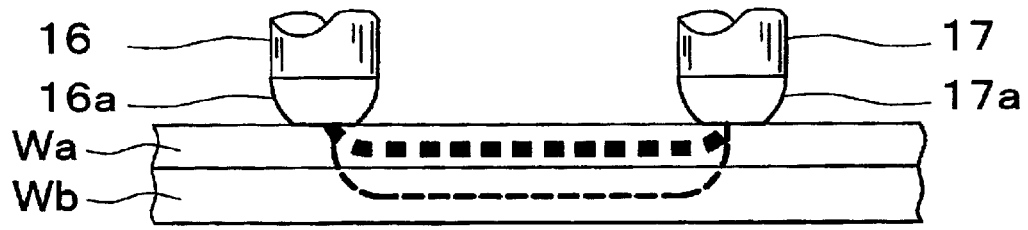
FIG. 6A shows a current path and the like according to the series spot welding method in a cross-sectional view.

If series spot welding is performed with no back electrode disposed as shown in FIG. 6A, most of the current (indicated by a bold dotted line in FIG. 6A) flows only through a steel plate Wa on one side that is pressed by electrode tips 16, 17. That is, only a low intensity of current (indicated by a fine dotted line) can flow through a steel plate Wb on the other side.

Thus, the intensity of reactive current that flows only through the steel plate Wa and that does not directly contribute to welding is higher than the intensity of active current that flows through both the steel plates Wa, Wb and that can be converted into thermal energy in a region where both the steel plates Wa, Wb are in contact with each other. Therefore, a nugget of sufficient size cannot be formed in this region, and as a result, required welding strength cannot be obtained in this region.

Figure 6B:
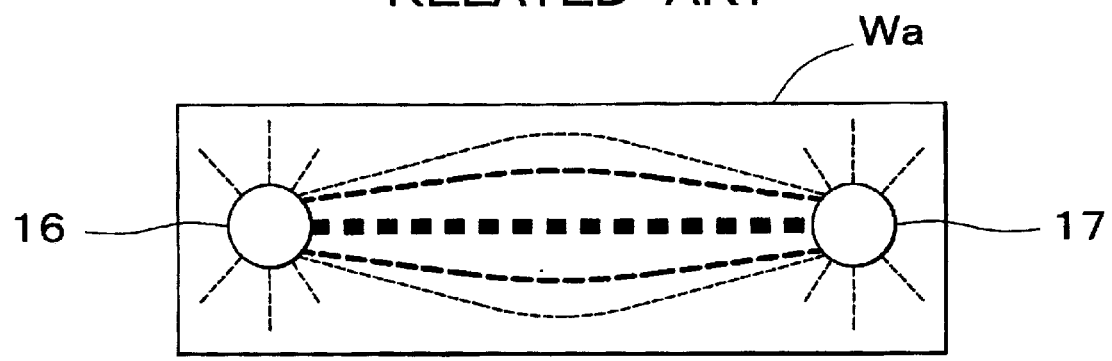
FIG. 6B shows the current path and the like according to the series spot welding method in a plan view.

Such flow of current occurs not only in a direction of thickness of the steel plates but also in a direction in which the steel plates stretch out. Therefore, as shown in FIG. 6B, the highest intensity of current (indicated by a bold dotted line) flows through the shortest path connecting the electrode tips 16, 17. The intensity of current decreases in proportion to an increase in distance between the electrode tips 16, 17 (indicated by a fine dotted line).

Figure 6C:
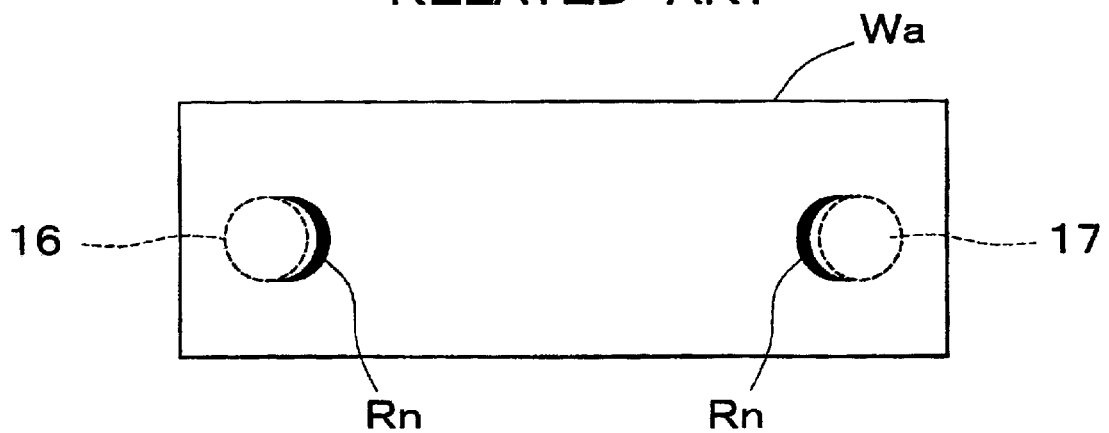
FIG. 6C is a plan view of a state of penetration after spot welding has been performed.

Thus, as shown in FIG. 6C, the steel plate Wa undergoes weld penetration in an arcuate shape around surfaces of contact between the electrode tips 16, 17 (indicated by dotted circles in FIG. 6C) only in a predetermined range where the electrode tips 16, 17 are opposed to each other. The inventors of the present application have confirmed through experiments that a nugget Rn of sufficient size cannot be formed in this case.

The inventors of the present application have also confirmed through experiments that a blow hole is formed as described below.

Figure 7A:
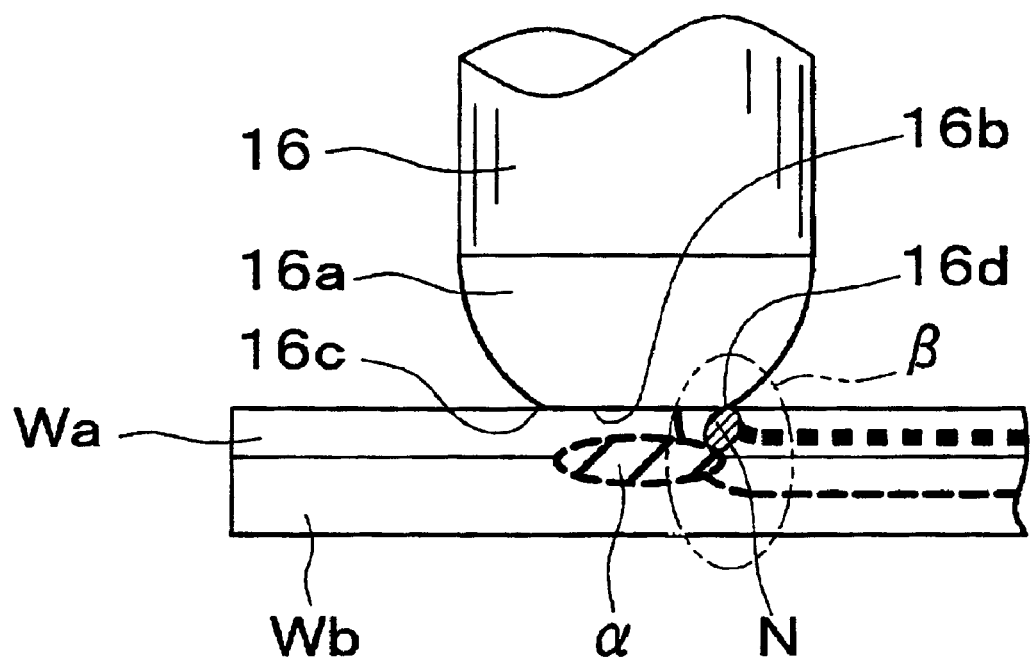
FIG. 7A is a cross-sectional view of a state of penetration during spot welding according to the series spot welding method and shows a state where spot welding is being performed.

That is, as shown in FIG. 7A, a flat portion 16b for enlarging the conduction diameter of welding current and reducing the amount of heat generated per unit area is generally formed in a leading edge portion 16a of the electrode tip 16 so as to suppress the electrode tip 16 and the steel plate Wa from being welded to each other due to resistance heat generated therebetween. For this reason, while a peripheral edge portion 16c as a contact end of the flat portion 16b and the steel plate Wa tends to exhibit high contact resistance, the highest intensity of current (indicated by a bold dotted line in FIG. 7A) flows through a section 16d of the peripheral edge portion 16c. The section 16d is located on the shortest path connecting the electrode tips 16, 17. As a result, only a low intensity of current (indicated by a fine dotted line in FIG. 7A) can flow through a region originally intended for formation of a nugget, namely, a region a of contact between the steel plates Wa, Wb.

Figure 7B:
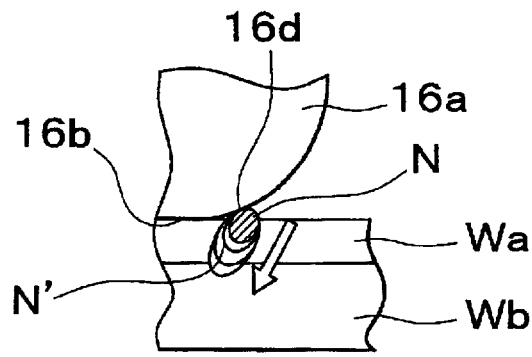
FIG. 7B is an enlarged view of a circle β shown in FIG. 7A and shows a state of an initial stage of welding.

Thus, as shown in FIG. 7B, a nugget N penetrating from an upper surface of the steel plate Wa is formed around the section 16d in an initial stage of welding. Formation of a nugget N' progresses gradually toward the steel plate Wb (indicated by a blank arrow in FIG. 7B).

Figure 7C:
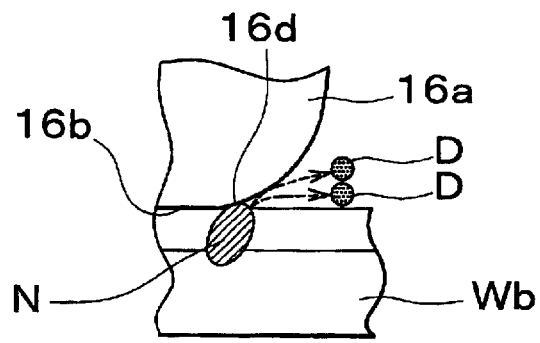
FIG. 7C is an enlarged view of the circle β shown in FIG. 7A and shows a state of a late stage of welding.

As shown in FIG. 7C, if formation of the nugget N then progresses as far as the region of contact between the steel plates Wa, Wb, fused metal starts to expand in the upper surface of the steel plate Wa where the nugget N was formed first. Therefore, the fused metal is scattered outside as a spatter D.

Figure 7D:
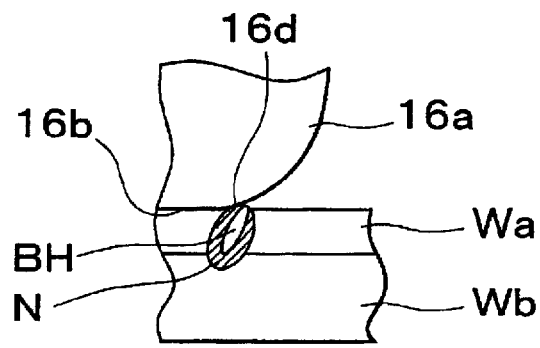
FIG. 7D is an enlarged view of the circle β shown in FIG. 7A and shows a state where welding has been terminated.

In circumstances where the spatter D is scattered, the progress of welding cannot be expected even if more welding current is supplied. Therefore, it is inevitable to stop welding in this stage. As shown in FIG. 7D, after welding has been terminated, a cavity i.e. a blow hole BH corresponding to the scattered spatter D is formed in the nugget N.

Because of the scatter of the spatter D as well as creation of such a blow hole BH as a so-called "surface crack" on the surface of the welded region of the steel plate Wa, only the nugget N of insufficient size can be formed in the region of contact between the steel plates Wa, Wb. If welding is attempted according to the series spot welding as mentioned above with no back electrode disposed, sufficient welding strength may not be obtained.

A series spot welding method according to one embodiment of the invention will be described hereinafter with reference to the drawings.

First Embodiment

Figure 1:
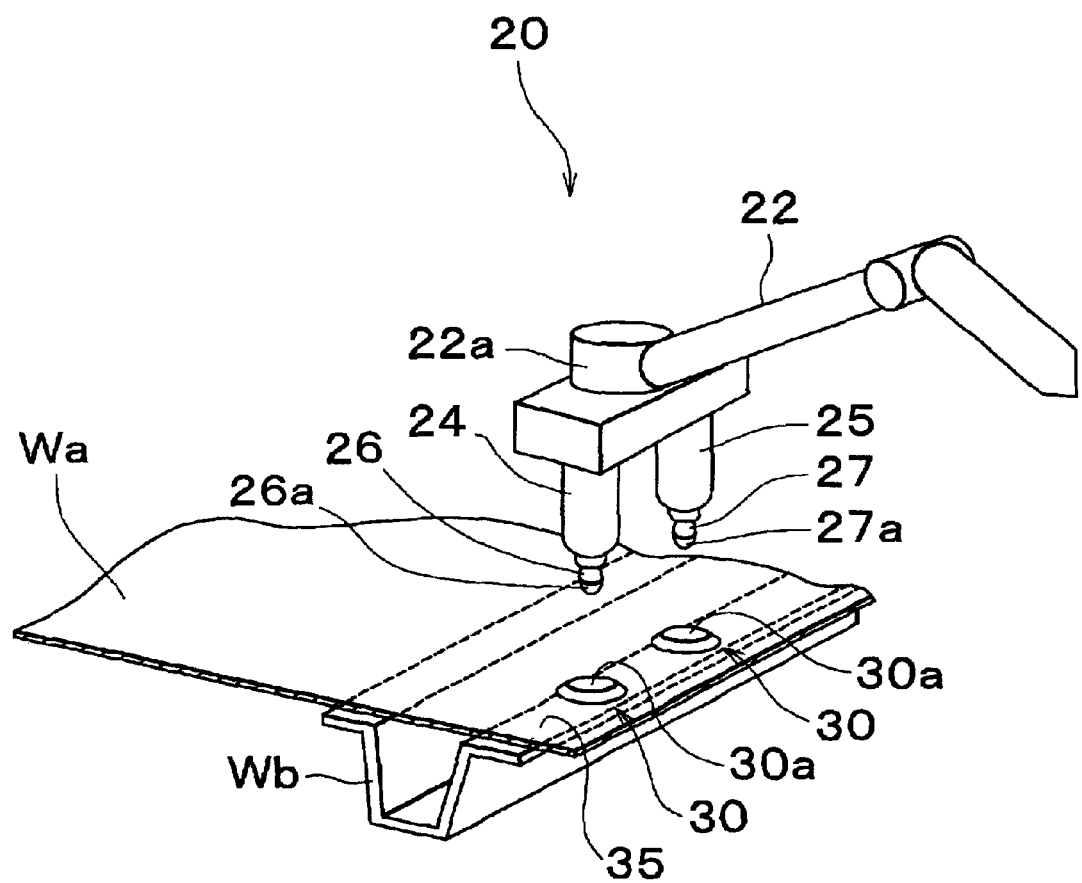
FIG. 1 is an explanatory view of a series spot welding method according to one embodiment of the invention.

FIG. 1 shows the steel plates Wa, Wb and a welding device 20 to which the series spot welding method is applied.

First of all, the configuration of the welding device 20 will be described with reference to FIGS. 1 and 2A.

As shown in FIG. 1, the welding device 20 is mainly composed of electrode tips 26, 27, cylinders 24, 25, a robot, and a welding transformer (not shown). The cylinders 24, 25 support and press the electrode tips 26, 27 respectively. The robot is equipped with a robot arm 22 for supporting the cylinders 24, 25 by means of a wrist portion 22a. The welding transformer can supply the electrode tips 26, 27 with welding current. In the first embodiment, the steel plate Wa has a thickness of 0.6 mm, and the steel plate Wb has a thickness of 2 mm.

Figure 2A:
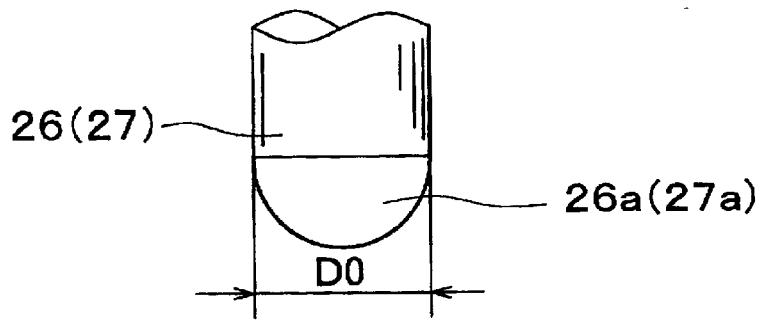
FIG. 2A is a side view of a leading edge of an electrode tip employed in the series spot welding method according to the first embodiment.

The electrode tips 26, 27 have spherical leading edge portions 26a, 27a respectively (see FIG. 2A). The cylinders 24, 25 support the electrode tips 26, 27 respectively such that the electrode tips 26, 27 are spaced from each other by a predetermined distance with their axes disposed parallel to each other. For example, if the leading edge portion 26a or 27a of the electrode tip 26 or 27 has a diameter D0 of 16 mm as shown in FIG. 2A, the distance between the electrode tips 26, 27 is set approximately equal to 35 mm.

The cylinders 24, 25 are designed such that the electrode tips 26, 27 supported thereby can move upwards and downwards. In particular, the cylinders 24, 25 serve to press the electrode tips 26, 27 downwards, namely, toward the steel plates Wa, Wb by means of a predetermined pressing force. Thus, a pair of the electrode tips 26, 27 spaced from each other can be pressed and brought into contact with the surface of the steel plate Wa, which is one of the two superimposed steel plates Wa, Wb.

The robot arm 22 supports and fixes the cylinders 24, 25 by means of the wrist portion 22a. The robot arm 22 serves to move the electrode tips 26, 27 supported by the cylinders 24, 25 respectively to predetermined locations on later-described convex portions 30 of the steel plate Wa.

The welding transformer (not shown) is designed such that a predetermined intensity of welding current can be supplied via a current cable connected to the electrode tips 26, 27. The welding current is supplied intermittently instead of being supplied continuously. For example, conduction of the welding current for a duration of (15/60) seconds is repeated at intervals of (45/60) seconds. The amount of the welding current is set, for example, equal to 10 kA.

Because the welding device 20 is thus configured, a pair of the electrode tips 26, 27 that are spaced from each other can be pressed and brought into contact with the steel plate Wa, namely, one of the two superimposed steel plates Wa, Wb. As a result, welding current can flow through a region between the electrode tips 26, 27.

The configuration of the steel plate Wa will now be described with reference to FIG. 1 and FIGS. 2B and 2C.

As shown in FIG. 1, the convex portions 30 are formed in the steel plate Wa on the side that is pressed by the electrode tips 26, 27. The convex portions 30 have bearing surfaces 30a, each of which is partially one stage higher than a general portion 35. FIGS. 2B and 2C show the configuration of each of the convex portions 30.

Figure 2B:
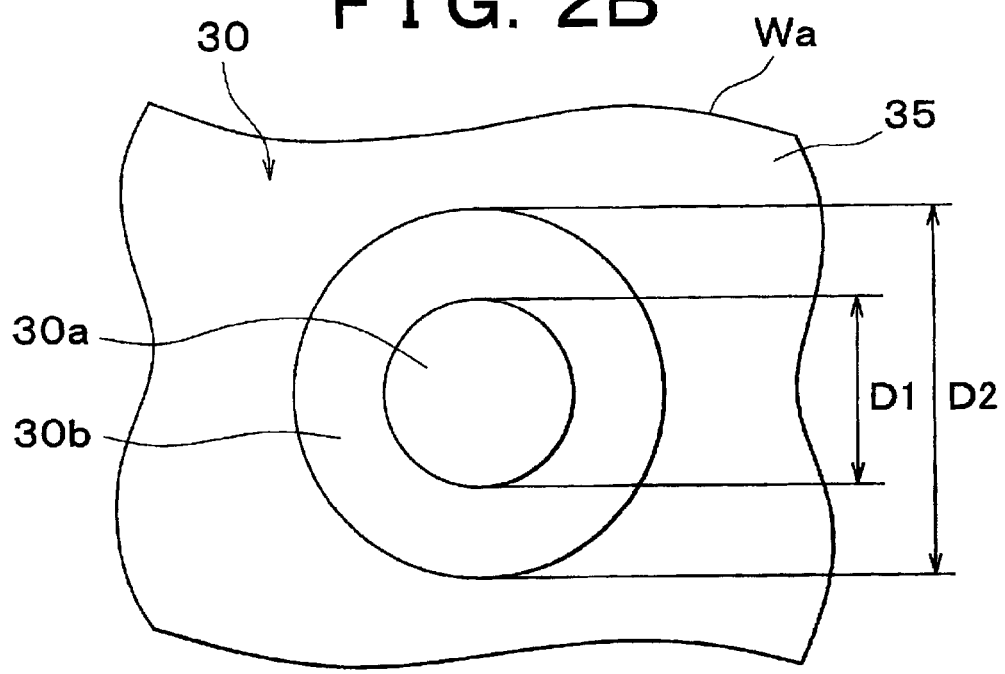
FIG. 2B is a plan view of a bearing surface formed in a steel plate employed in the series spot welding method.
Figure 2C:
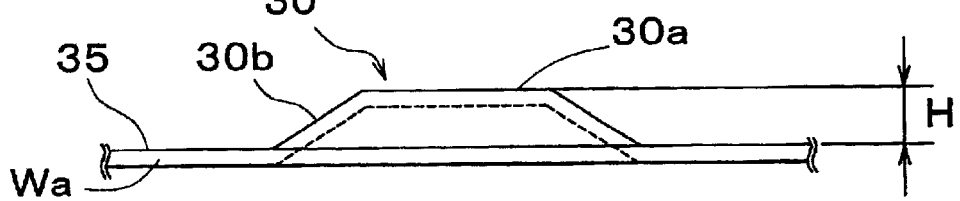
FIG. 2C is a side view of the bearing surface shown in FIG. 2B.

As shown in FIGS. 2B and 2C, each of the convex portions 30 formed on the steel plate Wa assumes the shape of a hollow truncated cone. Each of the circular bearing surfaces 30a is formed in an apex portion of a corresponding one of the convex portions 30.

That is, the convex portion 30 is designed to have the bearing surface 30a, which is formed in the apex portion as a flat circular surface via a tapered portion 30b that is so formed as to protuberate from the general portion 35 of the steel plate Wa in proportion to a decrease in diameter. The bearing surface 30a located in the apex portion is in the shape of a circle. Therefore, as will be described later, the bearing surface 30a can be deformed easily into a spherical shape by the leading edge portion 26a or 27b of the electrode tip 26 or 27.

More specifically, the convex portion 30 is formed by subjecting the steel plate Wa to press working. For example, if the bearing surface 30a has a diameter D1 set equal to 22 mm, the convex portion 30 has a diameter D2 set equal to 28 mm. The bearing surface 30a has a height H of 1 mm from the general portion 35.

The diameter D1 of the bearing surface 30a is set at least once as large as and at most three times as large as the diameter D0 of the leading edge of the electrode tip 26 or 27.

In the first embodiment, since the diameter D0 is 16 mm, the diameter D1 is set within a range of 16 mm to 48 mm. The former is once as large as the diameter D0, whereas the latter is three times as large as the diameter D0. That is, the diameter D1 is set at least once as large as, namely, equal to the diameter D0 of the leading edge of the electrode tip 26 or 27. Therefore, even if there is a slight dispersion in a positional relation between the electrode tip 26 or 27 and the bearing surface 30a, the bearing surface 30a can be deformed into a spherical shape by a spherical surface of the leading edge portion 26a or 27b of the electrode tip 26 or 27. Further, since the diameter D1 is set at most three times as large as the diameter D0 of the leading edge of the electrode tip 26 or 27, the bearing surface 30a can be partially deformed into a spherical shape without being deflected gently as a whole.

Processes and the like of spot welding performed according to the series spot welding method of the invention will now be described with reference to FIG. 1, FIGS. 3A to 3F, and FIG. 4.

FIGS. 3A to 3F sequentially show the processes of spot welding performed according to the series spot welding method of the invention. FIG. 4 schematically shows a state of formation of nuggets after spot welding has been performed according to the series spot welding method of the invention.

Figure 3A:
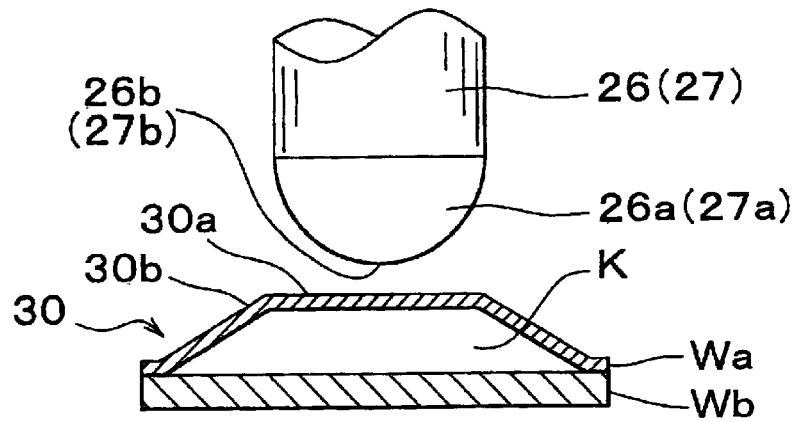
FIG. 3A is an explanatory view of a welding process according to the series spot welding method of the first embodiment and shows the bearing surface before it is deformed by being pressed by the electrode tip.
Figure 4:
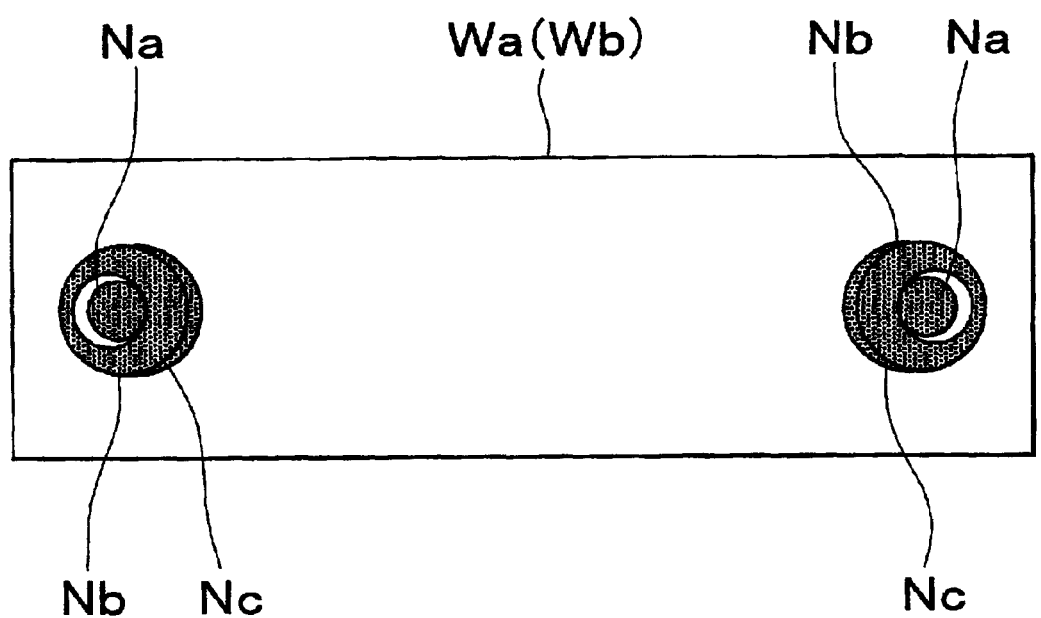
FIG. 4 is an explanatory view showing schematically a state of formation of the nugget after welding has been performed according to the series spot welding method of the first embodiment.

As shown in FIG. 1 and FIG. 3A, if the electrode tips 26, 27 are displaced and positioned by the robot arm 22 in such a manner as to be located above the convex portions 30 of the steel plate Wa, namely, one of the two superimposed steel plates Wa, Wb, the cylinders 24, 25 then depress the electrode tips 26, 27 toward the bearing surfaces 30a of the convex portions 30.

Even if the leading edge portions 26a, 27a of the electrode tips 26, 27 come into abutment on the bearing surfaces 30a as a result of depression of the electrode tips 26, 27 by the cylinders 24, 25, the electrode tips 26, 27 are further pressed by the cylinders 24, 25. Thus, the bearing surfaces 30a are crushed toward the steel plate Wb.

Figure 3B:
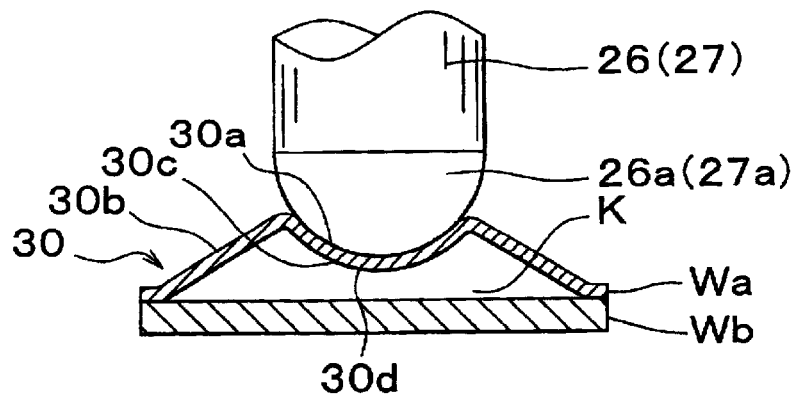
FIG. 3B shows the bearing surface when it is being deformed by being pressed by the electrode tip.

That is, as shown in FIG. 3B, the electrode tip 26 or 27 pressed by the cylinder 24 or 25 crushes the bearing surface 30a of the convex portion 30 in such a manner as to narrow down a space K that is formed between the steel plates Wa, Wb due to the existence of the convex portion 30. On the other hand, the leading edge portion 26a or 27a of the electrode tip 26 or 27 is spherical in shape as described above. Therefore, the bearing surface 30a is crushed toward the steel plate Wb while being deformed into the same spherical shape as the leading edge portion 26a or 27a. Thus, a concave portion having a spherical cavity is formed in the bearing surface 30a. Therefore, a contact surface 30c protruding spherically toward the steel plate Wb is formed on the back side of a corresponding one of the bearing surfaces 30a.

Figure 3C:
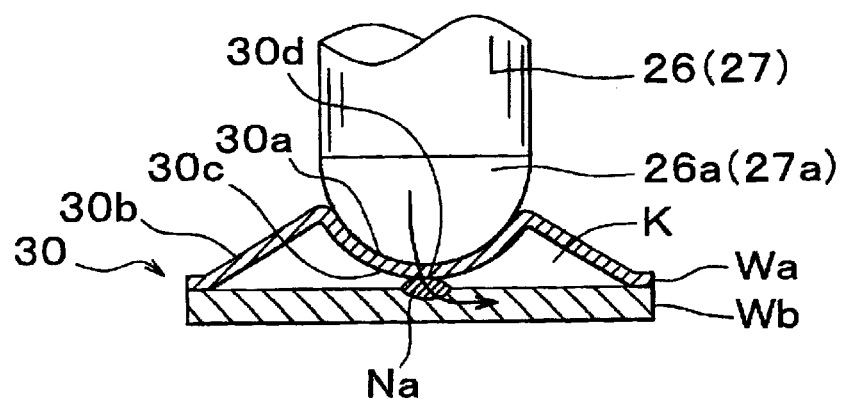
FIG. 3C shows an initial stage of formation of a nugget through conduction of welding current.

As shown in FIG. 3C, the electrode tip 26 or 27 is further pressed by the cylinder 24 or 25, whereby the bearing surface 30a is crushed by the electrode tip 26 or 27. An apex portion of the spherical contact surface 30c formed on the back side of the bearing surface 30a then comes into contact with the steel plate Wb. In other words, the most protrusive portion of the contact surface 30c comes into spot contact with the steel plate Wb earlier than the other portions thereof.

Thus, the contact surface 30c, which is the back side of the bearing surface 30a formed on the steel plate Wa, can come into spot contact with the steel plate Wb via such a spot contact portion 30d. Therefore, a conduction path narrowed down to a spot, that is, a conduction path with high contact resistance (indicated by a bold solid line with an arrow in FIG. 3C) is formed in the region of the spot contact portion 30d. Accordingly, the density of welding current flowing through the conduction path can be enhanced in comparison with the case of a conduction path formed by surface contact. Thus, welding current flowing through such a conduction path increases the amount of generation of resistance heat, and penetration is caused between the steel plates Wa, Wb. That is, a nugget Na can be formed between the steel plates Wa, Wb.

Figure 3D:
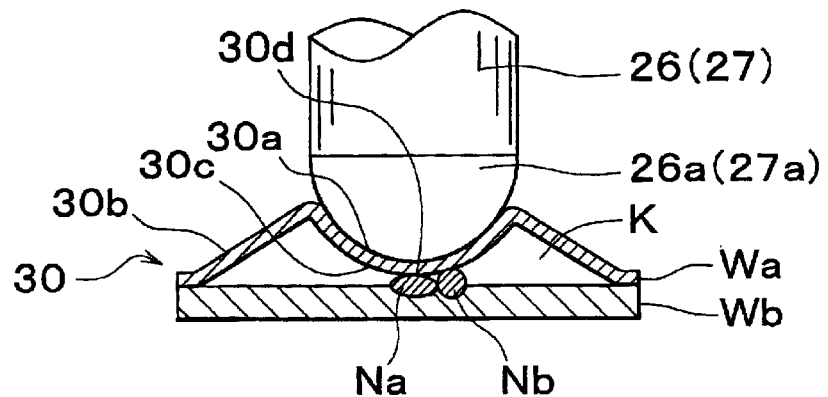
FIG. 3D shows an intermediate stage of formation of the nugget through conduction of welding current.

As shown in FIG. 3D, while pressurization by the cylinder 24 or 25 is continued, conduction of current through the electrode tip 26 or 27 is continued, whereby fused portions of the steel plates Wa, Wb formed by the nugget Na are pressed against each other. A blank arrow shown in FIG. 3E indicates a direction of pressurization by the electrode tip 26 or 27.

Figure 3E:
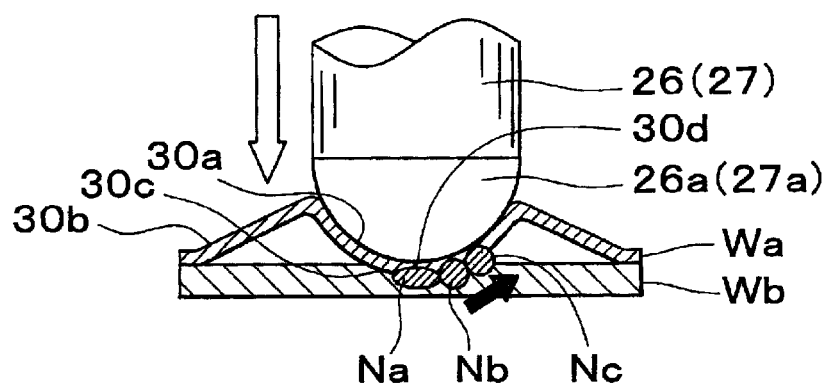
FIG. 3E shows a late stage of formation of the nugget through conduction of welding current.

As shown in FIG. 3E, since the steel plate Wa sinks into the steel plate Wb, the portion with high contact resistance moves along the contact surface 30c toward the surface of the steel plate Wa (toward a boundary defined by the steel plate Wa, the steel plate Wb, and the space portion K). That is, in comparison with the region of the nugget Na of the steel plates Wa, Wb liquefied by generation of resistance heat, the region of contact between the steel plates Wa, Wb located beside the region of the nugget Na exhibits higher contact resistance. Thus, formation of a nugget Nb progresses toward the surface extending along the contact surface 30c.

If the steel plate Wa sinks into the steel plate Wb by being pressed by the cylinder 24 or 25, the contact resistance of the nugget Nb thus formed decreases as well. Therefore, the region with high contact resistance moves again toward the surface of the steel plate Wa along the contact surface 30c. As a result, formation of another nugget Nc progresses toward the surface extending along the contact surface 30c.

Figure 3F:
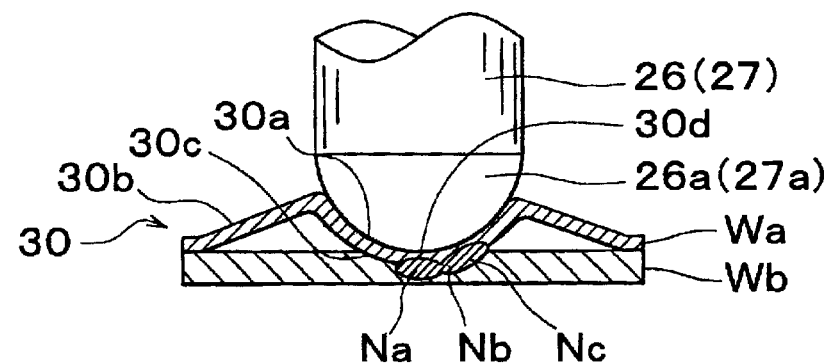
FIG. 3F shows a state where conduction of welding current has been terminated.

Formation of the nuggets thus progresses toward the surface along the contact surface 30c of the convex portion 30, whereby spot welding as shown in FIG. 3F is completed.

That is, as shown in FIG. 4, spot welding capable of ensuring a wide penetration range (Na, Nb, and Nc) is completed in the two superimposed steel plates Wa, Wb.

A series spot welding method according to a comparative example will now be described with reference to FIG. 5, so as to clarify the effect of the series spot welding method of the invention.

Figure 5:
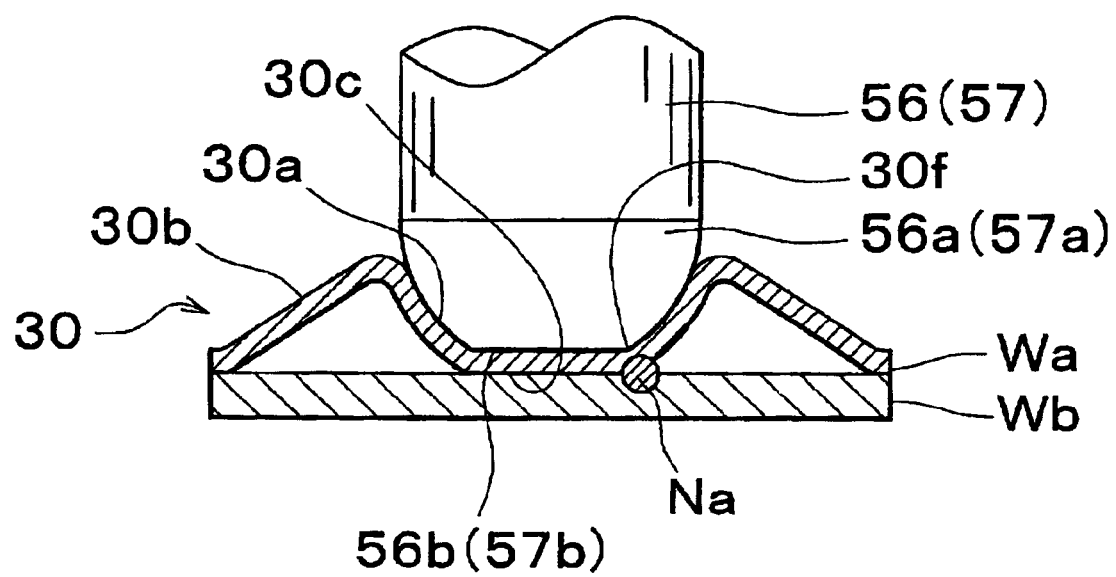
FIG. 5 is an explanatory view of a series spot welding method according to a comparative example.

In the comparative example shown in FIG. 5, a leading edge portion 56a or 57a of an electrode tip 56 or 57 is not formed into a spherical shape, and a flat portion 56b or 57b is provided as in the case of the electrode tips shown in FIG. 6A. The flat portion 56b or 57b is brought into contact with the bearing surface 30a of the convex portion 30 through pressurization in such a manner as to crush the bearing surface 30a, whereby the steel plates Wa, Wb are welded to each other.

As shown in FIG. 5, the flat portion 56b or 57b is formed in the leading edge portion 56a or 57a of the electrode tip 56 or 57 according to the comparative example. Thus, as far as the bearing surface 30a crushed by the leading edge portion 56a or 57a is concerned, the cavity of the concave portion formed by crushing the bearing surface 30a does not assume a spherical shape, and a flat bottom portion is formed in the concave portion. Thus, the contact surface 30c on the back side of the bearing surface 30a is also formed into a flat shape. Therefore, the steel plates Wa, Wb come into surface contact with each other due to the contact surface 30c. Accordingly, the surface contact portion exhibits lowered contact resistance. Thus, a region with high contact resistance is formed in a peripheral edge portion 30f corresponding to the peripheral edge of the surface contact portion. The nugget Na resulting from generation of resistance heat is formed in this region with high contact resistance.

Because the flat portions 56b or 57b is formed in the leading edge portion 56a or 57a of the electrode tip 56 or 57, the steel plate Wa does not sink into the steel plate Wb by being pressed by the electrode tip 26 or 27 as in the case of the aforementioned embodiment, even if the electrode tip 56 or 57 is pressed by the cylinder 24 or 25. Therefore, formation of nuggets does not progress towards the surface of the steel plate Wa due to the sinking of the steel plate Wa into the steel plate Wb.

Thus, according to the comparative example, even if the convex portion 30 of the first embodiment of the invention is formed in the steel plate Wa, the bearing surface 30a that is crushed by the electrode tip 56 or 57 is deformed only into a flat shape, not into a spherical shape. Therefore, as far as the two superimposed steel plates Wa, Wb are concerned, a certain penetration range can be ensured in the peripheral edge portion 30f of the contact surface 30c. However, the penetration range cannot but be narrower in comparison with the aforementioned first embodiment.

That is, this comparative example can make it clear that the spherical shape of the leading edge portion 26a or 27a of the electrode tip 26 or 27 according to the first embodiment of the invention plays an extremely important role in ensuring a wide penetration range through the progress of formation of the nuggets.

As described above, according to the series spot welding method of the first embodiment of the invention, the bearing surface 30a that is partially one stage higher than the general portion 35 is formed in the steel plate Wa, namely, one of the two superimposed steel plates Wa, Wb in a portion with which the electrode tip 26 or 27 is brought into contact through pressurization, and the leading edge portion 26a or 27a of the electrode tip 26 or 27 is formed into a spherical shape. The electrode tip 26 or 27 is pressed onto and brought into contact with the bearing surface 30a in such a manner as to crush the bearing surface 30a, whereby the steel plates Wa, Wb are welded to each other. Thus, the leading edge portion 26a or 27a of the pressed electrode tip 26 or 27 crushes the bearing surface 30a that is one stage higher than the general portion 35, whereby it becomes possible to first deform the bearing surface 30a into a spherical shape and then bring it into spot contact with the steel plate Wb. Thus, the conduction path narrowed down to a spot by the bearing surface 30a deformed into the spherical shape is formed between the steel plates Wa, Wb. Therefore, the density of welding current flowing through the conduction path can be enhanced, and penetration can be caused between the steel plates Wa, Wb by welding current flowing through the conduction path. In other words, the nugget N can be formed. Accordingly, the nugget of sufficient size can be formed in the region of contact between the steel plates Wa, Wb by causing welding current to flow between the electrode tips 26, 27 and pressurizing the electrode tips 26, 27. As a result, sufficient welding strength can be obtained even if there is no back electrode.

Further, according to the series spot welding method of the first embodiment of the invention, the bearing surface 30a is in the shape of a circle, and the diameter D1 of the bearing surface 30a is once to three times as large as the diameter D0 of the leading edge of the electrode tip 26 or 27. Because the bearing surface 30a is in the shape of a circle, it can be deformed into a spherical shape easily by the spherical surface of the leading edge portion 26a or 27b of the electrode tip 26 or 27. Further, since the diameter D1 is set at least once as large as the diameter D0 of the leading edge of the electrode tip 26 or 27, the bearing surface 30a can be deformed into a spherical shape by the spherical surface of the leading edge portion 26a or 27b of the electrode tip 26 or 27 even if there is a slight dispersion in a positional relation between the electrode tip 26 or 27 and the bearing surface 30a. Further, since the diameter D1 is set at most three times as large as the diameter D0 of the leading edge of the electrode tip 26 or 27, the bearing surface 30a can be partially deformed into a spherical shape without being deflected gently as a whole. Accordingly, the bearing surface 30a formed in the steel plate Wa can be reliably crushed into a spherical shape by the leading edge portion 26a or 27a of the electrode tip 26 or 27. Therefore, sufficient welding strength can be obtained easily even if there is no back electrode.

Second Embodiment

The second embodiment of the invention will now be described with reference to FIGS. 8 to 14.

As described above, according to the series spot welding method of the first embodiment, the bearing surface 30a that is partially one stage higher than the general portion 35 is formed in the steel plate Wa in the portion with which the electrode tip 26 or 27 is brought into contact through pressurization, and the leading edge portion 26a or 27a of the electrode tip 26 or 27 is formed into a spherical shape. The electrode tip 26 or 27 is pressed onto and brought into contact with the bearing surface 30a in such a manner as to crush the bearing surface 30a, whereby the steel plates Wa, Wb are welded to each other. Thus, the conduction path narrowed down to a spot by the bearing surface 30a deformed into the spherical shape is formed between the steel plates Wa, Wb, whereby the nugget N is formed between the steel plates Wa, Wb. As a result, sufficient welding strength can be obtained even if there is no back electrode.

Figure 9A:
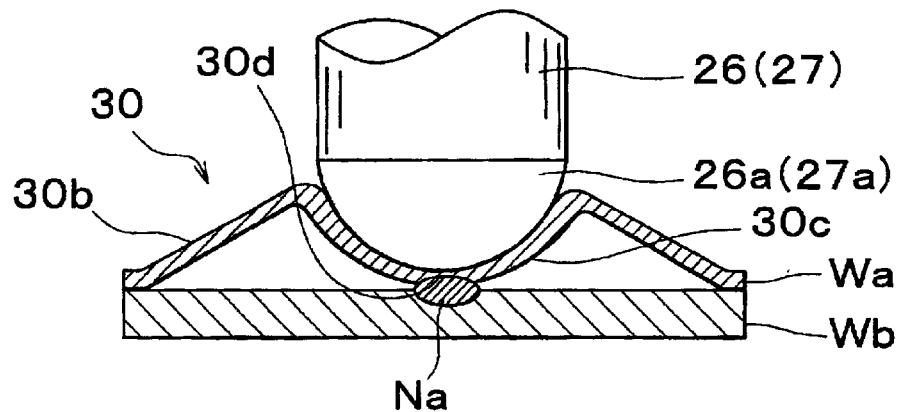
FIG. 9A is an explanatory view of a welding process according to the series spot welding method of the first embodiment and shows a stage where conduction of welding current has been started.
Figure 9B:
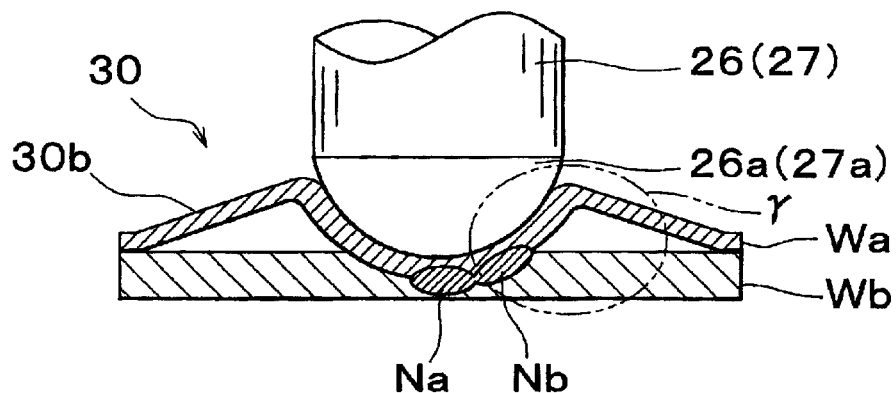
FIG. 9B shows a state where conduction of welding current has been completed.
Figure 9C:
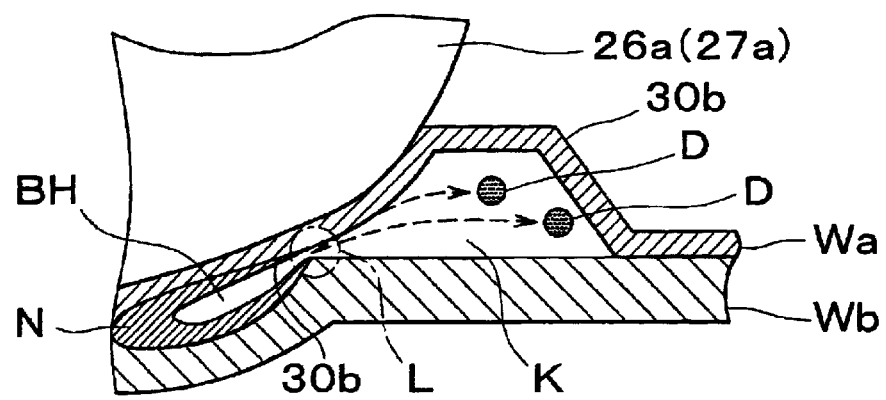
FIG. 9C is an enlarged view of a circle γ shown in FIG. 9B and shows a state of the late stage of welding.

However, after conducting an analysis of the cross-section of the welded regions, the inventors of the present application have confirmed that the nugget includes a blow hole BH in some cases even if sufficient welding strength is obtained (see FIG. 9C).

Figure 8:
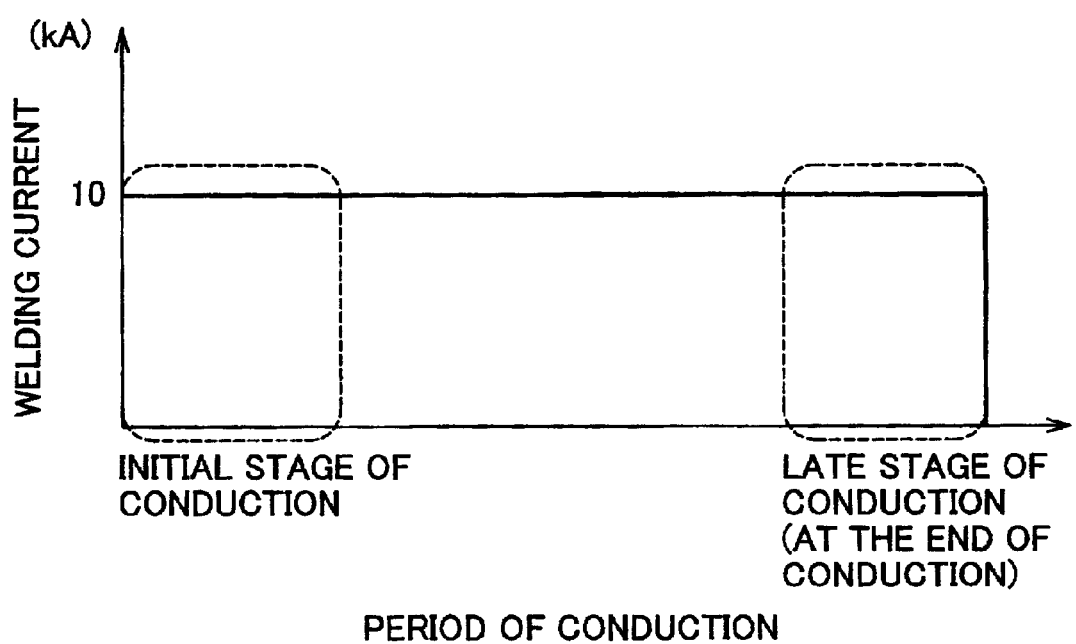
FIG. 8 is an explanatory view of a conduction pattern of welding current according to the series spot welding method of the first embodiment.

According to the series spot welding method of the first embodiment, the intensity of welding current flowing between the electrodes is set, for example, equal to 10 kA, and is controlled such that conduction for a duration of (15/60) seconds is continued at intervals of (45/60) seconds. In other words, the intensity of welding current is controlled on the basis of a conduction pattern as shown in FIG. 8. That is, the conduction pattern is set such that the intensity of welding current is maintained at a constant value of 10 kA from an initial stage of conduction, through intermediate and late stages of conduction, and to the end of conduction.

On the other hand, the series spot welding method of the invention is based on the premise that there is no back electrode disposed. Therefore, even if the steel plates Wa, Wb are pressed by the electrode tips 26, 27, the force applied to the welded regions of the steel plates Wa, Wb tends to be smaller in comparison with the case where there is a back electrode disposed.

Thus, as described already, if the supply of welding current is started by the pressed electrode tip 26 or 27, the nugget Na is formed between the steel plate Wb and an apex portion (the spot contact portion 30d) of the contact surface 30c on the back side of the bearing surface 30a (FIG. 9A). By continuing pressurization by the electrode tip 26 or 27 and the supply of welding current, formation of the nugget Nb progresses toward the surface of the steel plate Wa along the contact surface 30c (FIG. 9B). The greater the distance along the contact surface 30c between a portion of the nugget Nb and the nugget Na becomes, the smaller the pressing force applied to the portion by the electrode tips 26 or 27 becomes. Therefore, if thermal expansion of the nugget Nb progresses due to continuation of the supply of welding current, an opening L is likely to be formed FIG. 9C). It has been revealed that fused metal constituting the nugget N is scattered as the spatter D through the opening L.

That is, as shown in FIG. 9C, the force resulting from pressurization by the electrode tip 26 or 27 is relatively unlikely to be applied at the portion, in the region of contact between the contact surface 30c and the steel plate Wb, that is closest to the space portion K defined by the steel plates Wa, Wb. Thus, the opening L is formed as the nugget Nb thermally expands, and fused metal is scattered through the opening L as the spatter D. The amount of fused metal in the nugget N is reduced by the amount of the scattered spatter D. Therefore, the blow hole BH as shown in FIG. 9C is formed in the nugget N that has been quenched, coagulated, and contracted as a result of termination of conduction. The blow hole BH can cause a decrease in welding strength. Therefore, it is generally considered desirable to take every possible measure to prevent generation of such a blow hole.

Figure 10A:
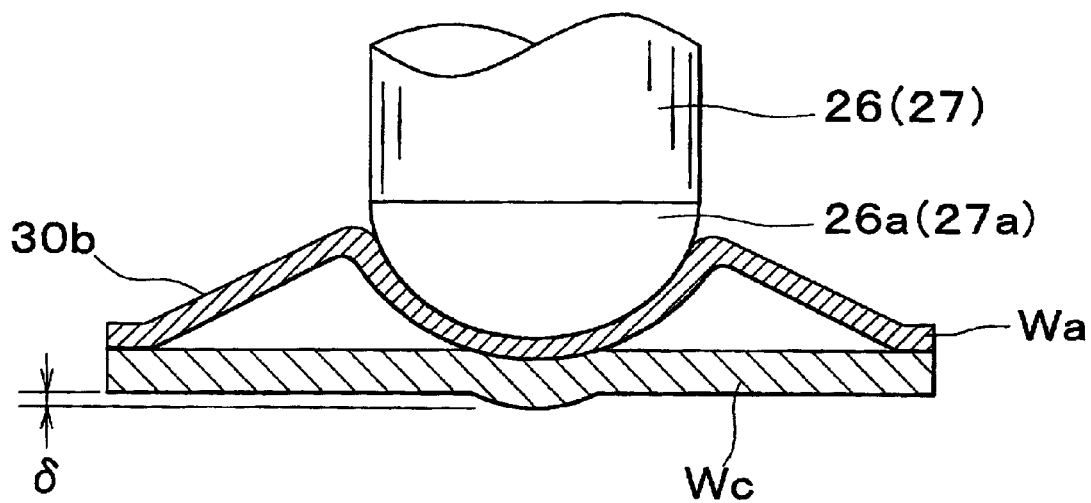
FIG. 10A is an explanatory view of a welding process according to the series spot welding method of the first embodiment and shows a stage where conduction of welding current has been started.

After further conducting research and analysis, the inventors of the present application have confirmed the following fact. That is, if a steel plate Wc as a lower plate has a small thickness (e.g., smaller than 2 mm) as shown in FIG. 10A, the steel plate Wc undergoes deflection δ because of a force (e.g., about 490N) resulting from pressurization by the electrode tip 26 or 27 and the softening of the steel plate Wc resulting from generation of resistance heat. Therefore, sufficient welding strength cannot be ensured in some cases (see FIG. 10B).

That is, if the steel plate Wc has a relatively small thickness, it exhibits high electric resistance in the direction of the surface of the steel plate Wc. As a result, the intensity of reactive current that flows only through the steel plate Wa as an upper plate and that does not directly contribute to welding is higher than the intensity of active current that flows through the steel plates Wa, Wc and that can be converted into thermal energy in a region of contact between the steel plates Wa, Wc. As a result, the intensity of welding current flowing through the region of contact is insufficient.

Figure 10B:
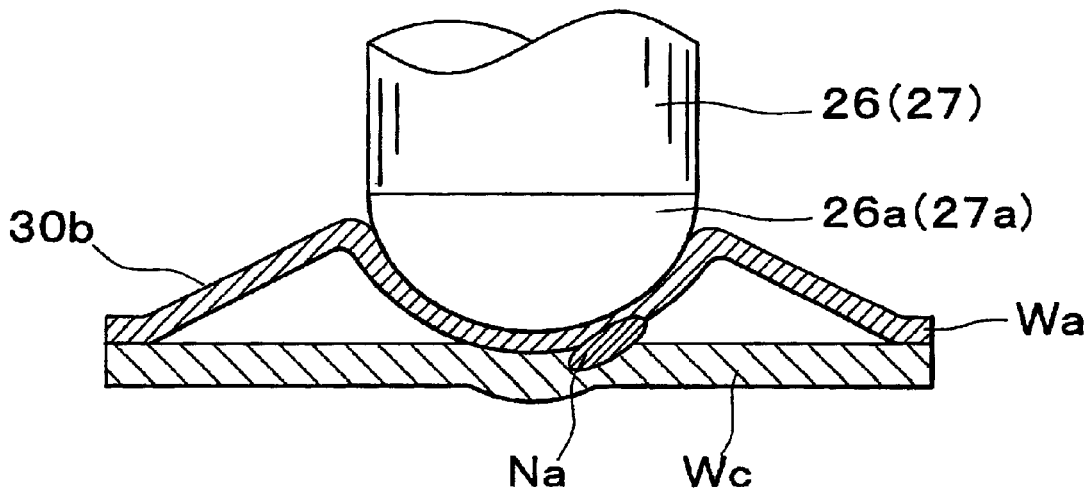
FIG. 10B shows a stage where conduction of welding current has been completed.

In an initial stage of conduction of welding current, the steel plate Wc undergoes deflection δ because of the softening of the region of contact between the steel plates Wa, Wc by generation of resistance heat and a force resulting from pressurization by the electrode tip 26 or 27. As a result, the steel plates Wa, Wc are deformed into a state of surface contact, but not into a state of spot contact. Then, the area of contact between the steel plates Wa, Wc is increased, and the electric resistance of the region of contact is reduced. This leads to a decrease in current density and a decline in generation of resistance heat. Therefore, a nugget of sufficient size cannot be formed. Thus, as shown in FIG. 10B, the welding of the steel plates Wa, Wb is realized only by the nugget Na formed in the intermediate stage of conduction. However, sufficient welding strength cannot be ensured in this case.

Figure 12:
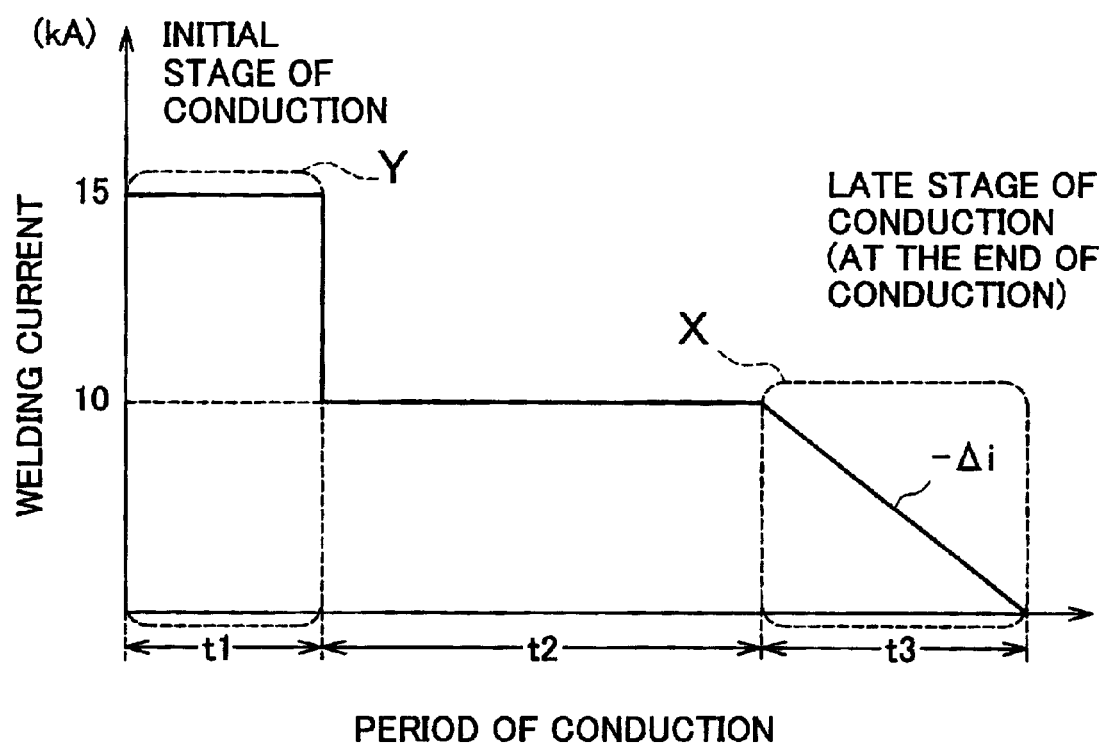
FIG. 12 is an explanatory view of a conduction pattern of welding current according to the series spot welding method of the second embodiment.

Therefore, the series spot welding method according to the second embodiment of the invention is designed to supply the steel plates Wa, Wb or the steel plates Wa, Wc with welding current according to a conduction pattern as shown in FIG. 12, and thus solves problems such as the aforementioned formation of the blow hole BH and insufficient welding strength.

The welding device to which the series spot welding method according to the second embodiment of the invention is applied is identical to the welding device 20 according to the first embodiment mentioned above. FIG. 11 shows an overall electric configuration of the welding device of the second embodiment. In FIG. 11, component members substantially identical to those of the welding device 20 shown in FIG. 1 are denoted by the same reference numerals.

As shown in FIGS. 1 and 11, the welding device 20 is mainly composed of the electrode tips 26, 27, the cylinders 24, 25, the robot, the welding transformer T, and a welding current control device CONT. The cylinders 24, 25 support and press the electrode tips 26, 27 respectively. The robot is equipped with the robot arm 22 for supporting the cylinders 24, 25 by means of the wrist portion 22a. The welding transformer T can supply the electrode tips 26, 27 with welding current. The welding current control device CONT can arbitrarily control welding current supplied to the electrode tips 26, 27.

In the second embodiment, as shown in FIG. 12, the conduction pattern according to the welding current control device CONT is set such that welding current has a downslope portion descending with a predetermined gradient ($-\Delta i$) in a late period X of conduction (at the end of conduction). Thus, it is possible to lower the temperature of the nugget N (see FIG. 13B) gently.

That is, while the supply of welding current is stopped all of a sudden according to the conduction pattern shown in FIG. 8, the intensity of welding current is reduced relatively gently according to the conduction pattern of the second embodiment of the invention. Therefore, when conduction is terminated, the nugget N is not quenched, coagulated, or contracted. Hence, a force resulting from pressurization by the electrode tips 26, 27 can be applied to the nugget N that has not been coagulated or contracted yet.

Figure 13A:
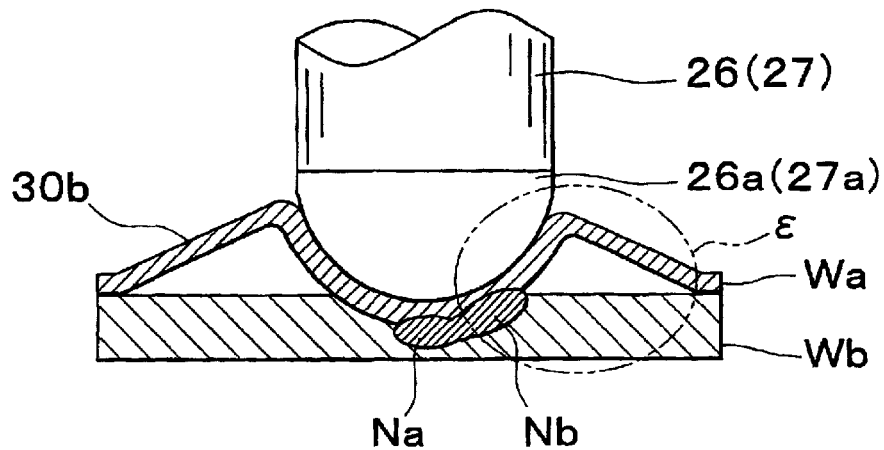
FIG. 13A is an explanatory view of a welding process according to the series spot welding method of the second embodiment and shows a stage where conduction of welding current has been completed.
Figure 13B:
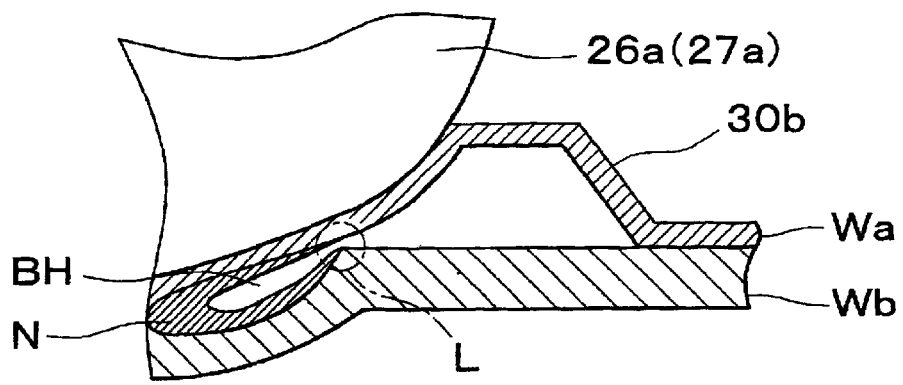
FIG. 13B is an enlarged view of a circle ε shown in FIG. 13A and shows a state of a late stage of welding.
Figure 13C:
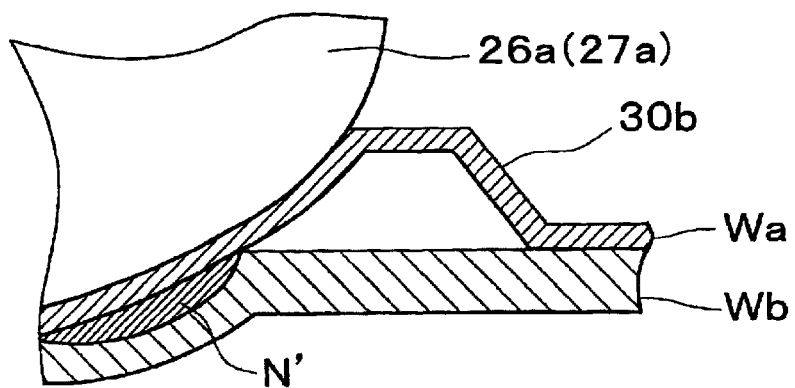
FIG. 13C is an enlarged view of the circle ε shown in FIG. 13A and shows a state where welding has been completed.

As shown in FIG. 13B, the opening L is formed as the nugget Nb (see FIG. 13A) is thermally expanded. Even if a spatter bursts out of the opening L, the blow hole BH formed thereby in the nugget N can be crushed by the electrode tip 26 or 27 in the late stage X of conduction. As a result, creation of the blow hole BH in the nugget N can be prevented. Therefore, the nugget N' having no blow hole BH can be formed as shown in FIG. 13C. Consequently, sufficient welding strength can be obtained even if there is no back electrode.

A period t3 of conduction in the late stage X of conduction is set equal to 5 to 10 cycles, for example, when an entire period (t1+t2+t3) of conduction is set equal to 20 cycles (1 cycle is equivalent to 60 seconds).

In the second embodiment, as shown in FIG. 12, the conduction pattern according to the welding current control device CONT is set in a stepped manner with a high intensity of welding current in an initial stage Y of conduction. Thus, the intensity of welding current in the initial stage Y of conduction can be increased in comparison with the intensity of welding current in the intermediate stage or the late stage X of conduction. Therefore, a relatively high intensity of welding current can be supplied in the initial stage Y of conduction.

That is, while the intensity of welding current is constant from the initial stage to the late stage of conduction according to the conduction pattern shown in FIG. 8, the intensity of current to be conducted in the initial stage Y of conduction and the intensity of current to be conducted in the intermediate stage of conduction are set equal to 15 kA and 10 kA respectively according to the conduction pattern of the second embodiment of the invention.

Figure 14A:
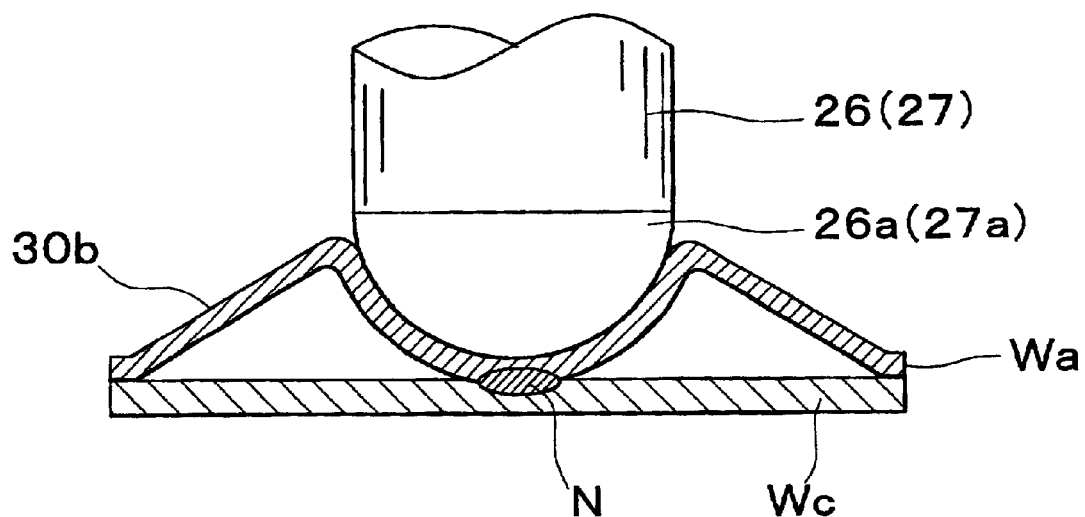
FIG. 14A is an explanatory view of a welding process according to the series spot welding method of the second embodiment and shows a stage where conduction of welding current has been started.
Figure 14B:
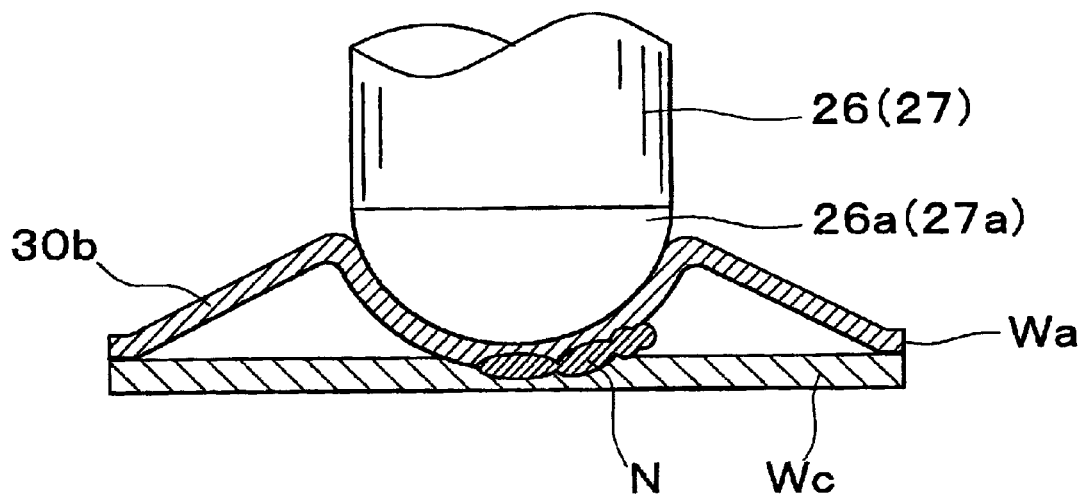
FIG. 14B shows a stage where conduction of welding current has been completed.

Hence, even if the steel plate Wc as a lower plate has a thickness smaller than 2 mm, for example, 1.6 mm as shown in FIG. 14A, a relatively high intensity of welding current can be caused to flow between the steel plates Wa, Wc before the steel plate Wc undergoes deflection δ (see FIG. 10A) in the initial period of conduction. That is, a relatively high intensity of welding current can be caused to flow between the steel plates Wa, Wc through a narrow conduction path that has not been widened yet by deflection δ of the steel plate Wc. Thus, even if the steel plate Wc has a small thickness, the nugget N can be formed in the initial stage Y of conduction. Accordingly, as shown in FIG. 14B, the desirable nugget N can be formed even if there is no back electrode. As a result, sufficient welding strength can be obtained.

A period t1 of conduction in the initial stage is set equal to 3 to 8 cycles, for example, when the entire period (t1+t2+t3) of conduction is set equal to 20 cycles (1 cycle is equivalent to 1/60 seconds). It is also appropriate that the intensity of welding current be about 12 to 16 kA.

Although the bearing surface is crushed by the electrode in the aforementioned embodiment, it is also appropriate that a metal plate crushed into the shape of the leading edge of the electrode in advance and another metal plate to be welded to the metal plate be superimposed on each other and be welded to each other.

Further, it is also appropriate that the metal plates be welded to each other at a pair of locations, namely, two locations, or at more than two locations.

Further, the welding transformer employed in the welding device of the first embodiment may be configured in the same manner as the welding transformer shown in FIG. 11. That is, the welding transformer of the first embodiment may be used in a state of being connected to the welding current control device CONT or a welding power source as shown in FIG. 11.

In the aforementioned embodiments, the steel plates Wa, Wb can be regarded as the first and second metal plates. The portion of the steel plate Wa where the bearing surface 30 is formed can be regarded as the second portion. The general portion 35 can be regarded as the first portion. The cylinders 24, 25 can be regarded as the pressing device. The wrist portion 22a can be regarded as the supporting member. The welding current control device CONT can be regarded as the controller.

In the illustrated embodiment, the controllers are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A series spot welding method comprising:
   superimposing a first metal plate and a second metal plate on each other, the first metal plate having a first portion that is in contact with the second metal plate when the first and second metal plates are superimposed on each other, wherein the first portion is not welded to the second metal plate, and at least one pair of second portions that are away from the second metal plate when the first and second metal plates are superimposed on each other, wherein the second portions are flat apex portions formed in the first metal plate and are welded to the second metal plate;
   pressing at least one pair electrodes having spherical leading edges onto the second portions in a direction toward the second metal plate, so as to deform the pair of second portions into a spherical shape wherein the at least one pair of electrodes are on a same surface to be welded; and
   causing current to flow between the electrodes, with the deformed second portions in contact with the second metal plate, so as to weld the first and second metal plates to each other.

2. The method according to claim 1, wherein
   the second portions are in the shape of a circle with a diameter that is one to three times as large as a diameter of the electrodes.

3. The method according to claim 1, wherein
   the welding of the first and second metal plates is terminated while welded regions are cooled gradually.

4. The method according to claim 3, wherein
   the welded regions are cooled gradually by reducing an intensity of the current with a predetermined gradient when conduction of the current is terminated.

5. The method according to claim 3, wherein
   when the welded regions are cooled gradually, the electrodes are pressed onto the second portions such that the second metal plate is pressed by the second portions.

6. The method according to claim 1, wherein
   when the first and second metal plates are welded to each other, an intensity of the current in an initial stage of conduction is set higher than the intensity of the current in at least one of an intermediate and late stage of conduction.

7. The method according to claim 6, wherein the intensity of current in the initial stage of conduction is set in a stepped manner with respect to the intensity of current in the intermediate stage of conduction.

8. The method according to claim 1, wherein the second portions are one stage higher than the first portion.

9. The method according to claim 1, wherein the second portions are in the shape of a circle, and the flat apex portions are in the shape of a truncated cone.

10. The method according to claim 1, wherein when the welding of the first and second metal plates is started, each of the second portions is in contact with the second metal plate at one spot thereof, and the pressing of the electrodes onto the second portions is thereafter continued so that the welding of the first and second metal plates progresses while areas of contact between the second portions and the second metal plate are enlarged.

11. A series spot welding method comprising:
superimposing a first metal plate and a second metal plate on each other, the first metal plate having a first portion that is not welded to the second metal plate, and at least one pair of second portions that are welded to the second metal plate, wherein the second portions are flat apex portions formed in the first metal plate;

pressing at least one pair of electrodes having spherical leading edges onto the second portions wherein the at least one pair of electrodes are on a same surface to be welded;

forming the second portions into a spherical shape identical to that of the leading edge of the electrodes; and causing current to flow between the electrodes, with the second portions formed into the spherical shape in contact with the second metal plate, so as to weld the first and second metal plates to each other.

12. The method according to claim 11, wherein the electrodes are pressed onto the second portions formed higher than the first portion after the first and second metal plates have been superimposed on each other, so that the second portions are formed into the spherical shape toward the second metal plate.

13. The method according to claim 12, wherein formation of the second portions into the spherical shape and the welding of the first and second metal plates are performed successively.

14. The method according to claim 11, wherein when the first and second metal plates are superimposed on each other, each of the second portions is partially away from the second metal plate.

15. A structural body welded by the method according to claim 1.

16. A structural body welded by the method according to claim 11.

* * * * *